United States Patent
Miyagoshi et al.

(10) Patent No.: US 7,359,615 B2
(45) Date of Patent: Apr. 15, 2008

(54) METHOD AND DEVICE FOR ENSURING STORAGE TIME FOR DIGITAL BROADCAST

(75) Inventors: Eiji Miyagoshi, Osaka (JP); Akihiro Watabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 925 days.

(21) Appl. No.: 10/692,804

(22) Filed: Oct. 27, 2003

(65) Prior Publication Data

US 2004/0141718 A1    Jul. 22, 2004

(30) Foreign Application Priority Data

Jan. 22, 2003    (JP)    ............................. 2003-013181

(51) Int. Cl.
- H04N 5/91 (2006.01)
- H04N 5/00 (2006.01)
- H04N 9/74 (2006.01)
- H04N 7/173 (2006.01)
- H04B 1/38 (2006.01)
- G06K 9/36 (2006.01)

(52) U.S. Cl. ............................. 386/46; 386/83; 386/95; 386/125; 348/580; 348/583; 375/220; 725/133; 725/134; 382/245

(58) Field of Classification Search .................. 386/46, 386/83, 95, 125; 348/580, 583; 375/220; 709/217; 711/101, 154, 161; 725/133, 134; 382/245

See application file for complete search history.

(56) References Cited

U.S. PATENT DOCUMENTS 4,432,009 A * 2/1984 Reitmeier et al. .......... 348/580

(Continued)

FOREIGN PATENT DOCUMENTS

| JP | 8-17137 A | 1/1996 |
|---|---|---|
| JP | 10-276400 | * 10/1998 |
| JP | 11-225314 | 8/1999 |
| JP | 2000-341627 | 12/2000 |
| JP | 2001-043115 | * 2/2001 |
| JP | 2001-43115 | 2/2001 |
| JP | 2001-210017 | 8/2001 |
| JP | 2002-171485 | 6/2002 |

OTHER PUBLICATIONS

Chinese Office Action issued in corresponding Chinese Patent Application No. CN 200410015605, dated Aug. 5, 2005 (Supplement to IDS submitted Nov. 4, 2005).

Japanese Office Action issued in corresponding Japanese Patent Application No. JP 2003-013181, dated Oct. 31, 2006.

*Primary Examiner*—Thai Q. Tran
*Assistant Examiner*—Syed Y. Hasan
(74) *Attorney, Agent, or Firm*—McDermott Will & Emery LLP

(57) ABSTRACT

When a digitized broadcast is recorded in a storage medium, a required capacity of the storage medium is firstly calculated on the basis of a bit-rate of digitized broadcast data and a recording time which is known in advance. If the remaining capacity of the storage medium is smaller than the required capacity of the storage medium, for example, a frame rate decimation and pixel reduction are performed upon a broadcast to be newly stored, a re-encoding processing is performed for the broadcast and then the resultant broadcast is stored in the storage medium. If the remaining storage capacity of the storage medium is larger than the required capacity of the storage medium and thus remains, a frame interpolation and pixel interpolation are performed for the broadcast to be stored and then a re-encoding processing is performed for the resultant broadcast in order to improve its image quality. As a result, recording of the broadcast data in the storage medium can be ensured.

27 Claims, 3 Drawing Sheets

U.S. PATENT DOCUMENTS

| | | | |
|---|---|---|---|
| 4,825,286 A * | 4/1989 | Graves | 348/484 |
| 5,684,799 A * | 11/1997 | Bigham et al. | 370/397 |
| 6,016,507 A * | 1/2000 | Carroll et al. | 709/217 |
| 6,529,552 B1 | 3/2003 | Tsai et al. | |
| 6,671,454 B1 * | 12/2003 | Kaneko et al. | 386/83 |
| 7,136,573 B2 * | 11/2006 | Kikuchi et al. | 386/83 |
| 7,177,522 B2 * | 2/2007 | MacInnis | 386/68 |
| 2002/0012530 A1 | 1/2002 | Bruls | |
| 2002/0159348 A1 * | 10/2002 | Kim et al. | 369/47.16 |
| 2002/0184457 A1 * | 12/2002 | Yuasa et al. | 711/161 |
| 2003/0099285 A1 * | 5/2003 | Graziano et al. | 375/220 |
| 2003/0110513 A1 * | 6/2003 | Plourde et al. | 725/134 |
| 2003/0118243 A1 * | 6/2003 | Sezer et al. | 382/245 |
| 2005/0163473 A1 * | 7/2005 | Takahashi et al. | 386/46 |

* cited by examiner

METHOD AND DEVICE FOR ENSURING STORAGE TIME FOR DIGITAL BROADCAST

BACKGROUND OF THE INVENTION

The present invention relates to a method and a device for ensuring storage time for digital broadcast that can ensure recording time required when a digital broadcast compressed by MPEG or the like is stored and recorded in a recording medium such as an optical disk, an optomagnetic disk or a hard disk.

Recently, in accordance with improvement of image signal processing techniques, a record-and-playback device for recording in a disk-shaped storage medium that is capable of freely recording/playing back a video or voice digital signal, such as a DVD-RAM or a hard disk has been developed.

As a method for storing and recording analog broadcast data in such a storage medium, for example, as disclosed in Japanese Patent Application Laid-Open (JP-A) No. 8-17137, there has been known a method that a target bit-rate is calculated on the basis of the storage capacity of the storage medium and a predetermined recording time and then the data is encoded so as to be contained in the storage medium. Namely, because the recording capacity for the storage medium and the recording time for an analog broadcast to be stored are known, a bit-rate can be determined by the expression, recording capacity÷recording time. Then, control is performed so that the analog broadcast is compressed and recorded at this resultant bit-rate.

In the case of storing and recording not analog broadcast data but digital broadcast data, however, sources for the digital broadcast are for a standard television in current CS broadcasting performed in Japan. In BS digital broadcasting, a standard television and high-definition television are supported. Further, even in the same standard television or high-definition television, a bit-rate of broadcast is different for each program. In ground wave digital broadcasting that will be started in 2003 or later, a standard television, a high-definition television and a level lower than MPEG4 Simple Profile Level 3 will be provided. In accordance with MPEG4 Simple Profile Level 3, an image size is CIF (¼ of current vertical and horizontal sizes, respectively) and a bit-rate is equal to or less than 384 kbit/s. Thus, when these three kinds of broadcasts are stored and recorded in a digital form, a storage time may be varied for each of the bit-rates for these broadcasts even in the case of storing the same broadcast program, unlike a conventional analog VHS VTR which can simply define the storage time in a 120 min tape as two hours in a standard mode and six hours in a triple-mode. Accordingly, a problem exists in the method for ensuring a storing and recording time.

SUMMARY OF THE INVENTION

An object of the present invention is to provide a method and a device for ensuring the time for digital broadcasts transmitted at various bit-rates to be recorded in a storage medium.

In order to accomplish the aforementioned object, in accordance with the present invention, when a digitized and then transmitted broadcast is stored and recorded, the capacity of a storage medium required for storing the broadcast is calculated. Then, the required capacity is compared to an actual empty area in the storage medium, a bit-rate of the broadcast to be stored is appropriately converted, and the resultant broadcast is stored.

According to the present invention, a method for ensuring a storage time for digital broadcast at the time of storing data for a digitized and then transmitted broadcast comprises the steps of: monitoring a predetermined recording time for the broadcast and a bit-rate of the broadcast and calculating, in real time, a required capacity of a storage medium; determining whether or not the calculated required capacity of the storage medium can be contained within an empty area or a freely limited area of the storage medium; if the calculated required capacity of the storage medium cannot be contained as the result of the determination, converting, in real time, the bit-rate of the broadcast into a smaller one; and storing the converted broadcast in the storage medium.

In accordance with the present invention, the method for ensuring a storage time for digital broadcast further comprises the steps of: if the calculated required capacity of the storage medium can be contained as the result of the determination, determining whether or not the empty area or freely limited area of the storage medium remains; if the empty area or freely limited area remains, converting, in real time, the bit-rate of the broadcast into a larger one; and storing the converted broadcast into the storage medium.

According to the present invention, the method for ensuring a storage time for digital broadcast further comprises the step of: if the calculated required capacity of the storage medium can be contained as the result of the determination, storing the broadcast in the storage medium without converting the bit-rate.

According to the present invention, in the method for ensuring a storage time for digital broadcast, the step of converting the bit-rate of the digitized broadcast into a smaller one is an operation of missing a part of the broadcast data.

In accordance with the method for ensuring a storage time for digital broadcast of the present invention, the step of converting the bit-rate of the digitized broadcast into a smaller one is an operation of returning the broadcast in a baseband and performing a compression processing again for the broadcast.

In accordance with the method for ensuring a storage time for digital broadcast of the present invention, the operation of returning the broadcast in a baseband and performing a compression processing again for the broadcast is performed by utilizing a system for compressing an analog broadcast, decoding the compressed digital data and then playing back the resultant data.

According to the present invention, in the method for ensuring a storage time for digital broadcast, the step of converting the bit-rate of the digitized broadcast into a smaller one is an operation of returning the broadcast in a baseband, then performing image resolution conversion or image frame rate conversion upon the broadcast and performing the compression processing again upon the resultant broadcast.

According to the present invention, in the method for ensuring a storage time for digital broadcast, the step of converting the bit-rate of the digitized broadcast into a smaller one is performed by selecting one from three kinds of operations, i.e., the operation of missing a part of the broadcast data, the operation of returning the broadcast in a baseband and performing a compression processing again upon the broadcast and the operation of returning the broadcast in a baseband, then performing image resolution conversion or image frame rate conversion upon the broadcast and performing the compression processing again upon the resultant broadcast.

The method for ensuring a storage time for digital broadcast of the present invention further comprises the step of: if the calculated required capacity of the storage medium cannot be contained, deleting a broadcast which has been already stored in the storage medium to ensure the required capacity of the storage medium.

The method for ensuring a storage time for digital broadcast of the present invention further comprises the step of: if the calculated required capacity of the storage medium cannot be contained, re-compressing the broadcast which has been already stored in the storage medium to ensure the required capacity of the storage medium.

In accordance with the present invention, in the method for ensuring a storage time for digital broadcast, the step of re-compressing the broadcast which has been already stored in the storage medium is performed by the operation of missing a part of the stored broadcast data, the operation of returning the stored broadcast in a baseband and performing a compression processing again upon the broadcast or the operation of returning the stored broadcast in a baseband, then performing image resolution conversion or image frame rate conversion and performing a compression processing again upon the broadcast.

In accordance with the present invention, in the method for ensuring a storage time for digital broadcast, when a plurality of already stored broadcasts exist in the storage medium, a broadcast that a set period of time or longer has passed since its storage will be deleted.

In accordance with the present invention, in the method for ensuring a storage time for digital broadcast, when a plurality of already stored broadcasts exist in the storage medium, a broadcast which has been decoded at least once since its storage will be deleted.

In accordance with the present invention, in the method for ensuring a storage time for digital broadcast, when a plurality of already stored broadcasts exist in the storage medium, a broadcast which is stored in the storage medium and then copied in other storage medium will be deleted.

In accordance with the present invention, in the method for ensuring a storage time for digital broadcast, when a plurality of already stored broadcasts exist in the storage medium, a broadcast which was stored at the earliest date will be deleted.

In accordance with the present invention, in the method for ensuring a storage time for digital broadcast, when a plurality of already stored broadcasts exist in the storage medium, a broadcast that a set period of time or longer has passed since its storage, a broadcast which has been decoded at least once since its storage, a broadcast which is stored in the storage medium and then copied in other storage medium or a broadcast which was stored at the earliest date will be deleted, and these broadcasts are selected in accordance with a predetermined priority.

According to the present invention, a device for ensuring a storage time for digital broadcast at the time of storing a digitized and then transmitted broadcast comprises a required capacity calculation circuit for monitoring a predetermined recording time of the broadcast and a bit-rate of the broadcast and calculating, in real time, a required capacity of the storage medium; a determination circuit for determining whether or not the required capacity of the storage medium calculated in the required capacity calculation circuit can be contained within an empty or freely limited area in the storage medium; and a bit-rate conversion circuit for, if the calculated required capacity of the storage medium cannot be contained as the result of the determination by the determination circuit, converting, in real time, the bit-rate of the broadcast into a smaller one and storing the converted broadcast in the storage medium.

According to the present invention, in the device for ensuring a storage time for digital broadcast, the determination circuit further determines, if the calculated required capacity of the storage medium can be contained, whether or not the empty or freely limited area of the storage medium remains. The device further comprises a second bit-rate changing circuit for, if the empty or freely limited area remains as the result of the determination by the determination circuit, converting, in real time, the bit-rate of the broadcast into a larger one and storing the converted broadcast in the storage medium.

In the device for ensuring a storage time for digital broadcast of the present invention, the required capacity calculation circuit comprises a determination circuit for writing an inputted broadcast stream in a storage memory and determining the bit-rate of the broadcast on the basis of its storage time and storage amount.

The device for ensuring a storage time for digital broadcast of the present invention further comprises a deletion circuit for, if the calculated required capacity of the storage medium cannot be contained as the result of determination by the determination circuit, deleting a broadcast which has been already stored in the storage medium.

The device for ensuring a storage time for digital broadcast of the present invention further comprises a re-compression circuit for, if the calculated required capacity of the storage medium cannot be contained as the result of determination by the determination circuit, re-compressing a broadcast which has been already stored in the storage medium.

In the device for ensuring a storage time for digital broadcast of the present invention, the required capacity calculation circuit, the determination circuit and the bit-rate conversion circuit are integrated onto a chip.

As described above, in accordance with the present invention, even if the bit-rate of a digitized broadcast is varied, a required capacity of a storage medium at an original bit-rate of the broadcast is successively calculated. If the required capacity of the storage medium cannot be contained within an empty or freely limited area in the storage medium, the bit-rate of the broadcast is converted into a smaller one. Thus, the capacity of the storage medium required for the broadcast can be contained within the remaining storage capacity and the broadcast can be reliably stored and recorded in the storage medium.

Especially in the present invention, if the required capacity of the storage medium can be successfully contained within the remaining storage capacity, the transmission bit-rate of the broadcast is converted into a larger one and the resultant broadcast is stored in the storage medium. Thus, the broadcast can be stored and recorded with high image quality.

The present invention can be provided inexpensively because a re-compression processing is performed for a broadcast to be newly stored by utilizing existing devices in a storage-and-playback system.

Further, in accordance with the present invention, the required capacity of the storage medium is ensured in an empty area therein by deleting or re-compressing a broadcast which has been already stored in the storage medium. Thus, while maintaining at a bit-rate required for successfully maintaining a played back image, the broadcast to be newly stored can be reliably stored and recorded in the storage medium. In accordance with the present invention, among a plurality of already stored broadcasts, a broadcast that a set period of time has passed since its storage or a broadcast that is at least decoded or copied is preferentially deleted or re-compressed. As a result, the already stored broadcast can be deleted or re-compressed depending on a degree of necessity.

DETAILED DESCRIPTION OF THE INVENTION

Preferred embodiments of the present invention will be described hereinafter with reference to the attached drawings.

Figure 1:
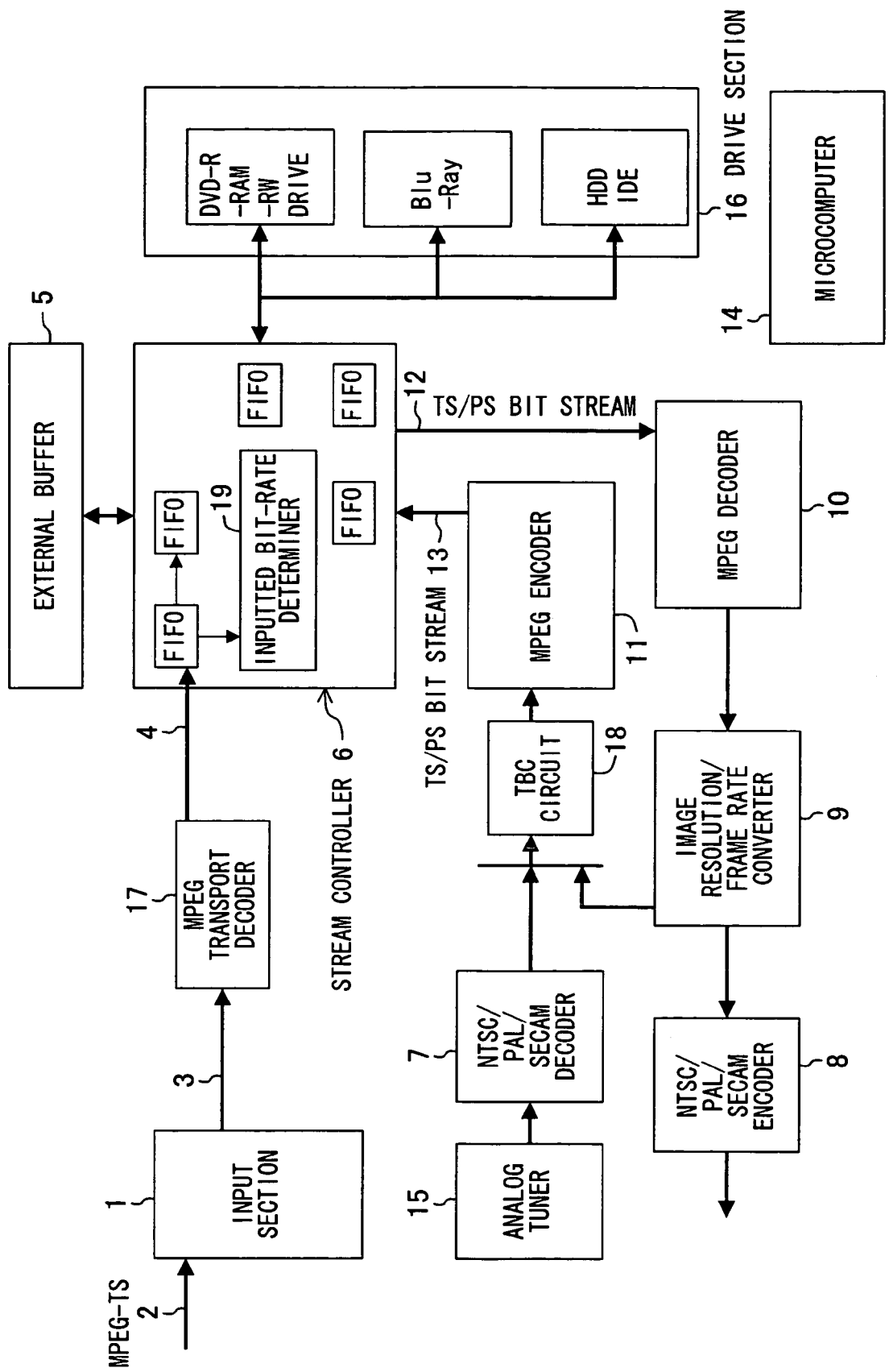
FIG. 1 is a block diagram illustrating a device for ensuring a storage time for digital broadcast relating to embodiments of the present invention.

FIG. 1 is a block diagram illustrating the specific structure of a device for ensuring storage time for digital broadcast relating to the embodiments of the present invention.

The device for ensuring storage time for digital broadcast illustrated in FIG. 1 is mainly configured by an input section 1, an MPEG transport decoder 17, a stream controller 6, an MPEG decoder 10, an image resolution/frame rate converter 9, an MPEG encoder 11, a drive section 16 and a microcomputer 14 for entirely controlling these elements.

Inputted to the input section 1 is a broadcast signal MPEG-TS 2 obtained by multiplexing at least one broadcast program inputted from a tuner section of a satellite, cable television or ground wave digital broadcasting, such as an MPEG-TS signal. The input section 1 outputs the multiplexed TS bit stream 3 to the MPEG transport decoder 17. The MPEG transport decoder 17 selects only a broadcast program selected in accordance with information about the selected program designated in advance by the microcomputer 14, and outputs the TS bit stream 4 of the selected program. The total storage time for the TS bit stream 4 of the selected broadcast program is inputted in advance by various methods including G-Code, EPG, and user's time setting and the like, and thus is known by the microcomputer 14 prior to storing and recording of the broadcast program.

The TS bit stream 4 of the selected broadcast program outputted from the MPEG transport decoder 17 is inputted to the stream controller 6. This stream controller 6 stores and records the inputted TS bit stream 4 of the broadcast program in a storage medium driven by the drive section 16 such as DVD-R, DVD-RAM, DVD-RW, Blu-Ray disk or contained hard disk. This stream controller 6 has the function of determining a bit-rate of the TS bit stream 4 of the broadcast program to be stored prior to the broadcast program being stored in the storage medium. In order to exhibit this function, the stream controller 6 has an inputted bit-rate determiner (determination circuit) 19 therein, and an external buffer memory 5 is connected thereto. The stream controller 6 starts to store the inputted TS bit stream 4 of the selected broadcast program in the external buffer memory (storage memory) 5 before outputting the same to the drive section 16. Under this state, the inputted bit-rate determiner (determination circuit) 19 monitors, in real time, the bit-rate of the TS bit stream 4 of the selected broadcast program on the basis of a storage time and storage amount in the external buffer memory 5, and outputs the determined bit-rate to the microcomputer 14.

The microcomputer 14 determines a required capacity of the storage medium on the basis of the determined bit-rate and the storing and recording time for the broadcast program to be stored, compares the required capacity of the storage medium to an empty area in the storage medium in the drive section 16 or a freely limited area determined in the microcomputer 14 by a user (which will be referred to as a remaining storage capacity hereinafter), and determines whether or not the broadcast program to be stored can be stored and recorded in the storage medium. The specific example of such determination will be described with reference to FIG. 2.

Figure 2:
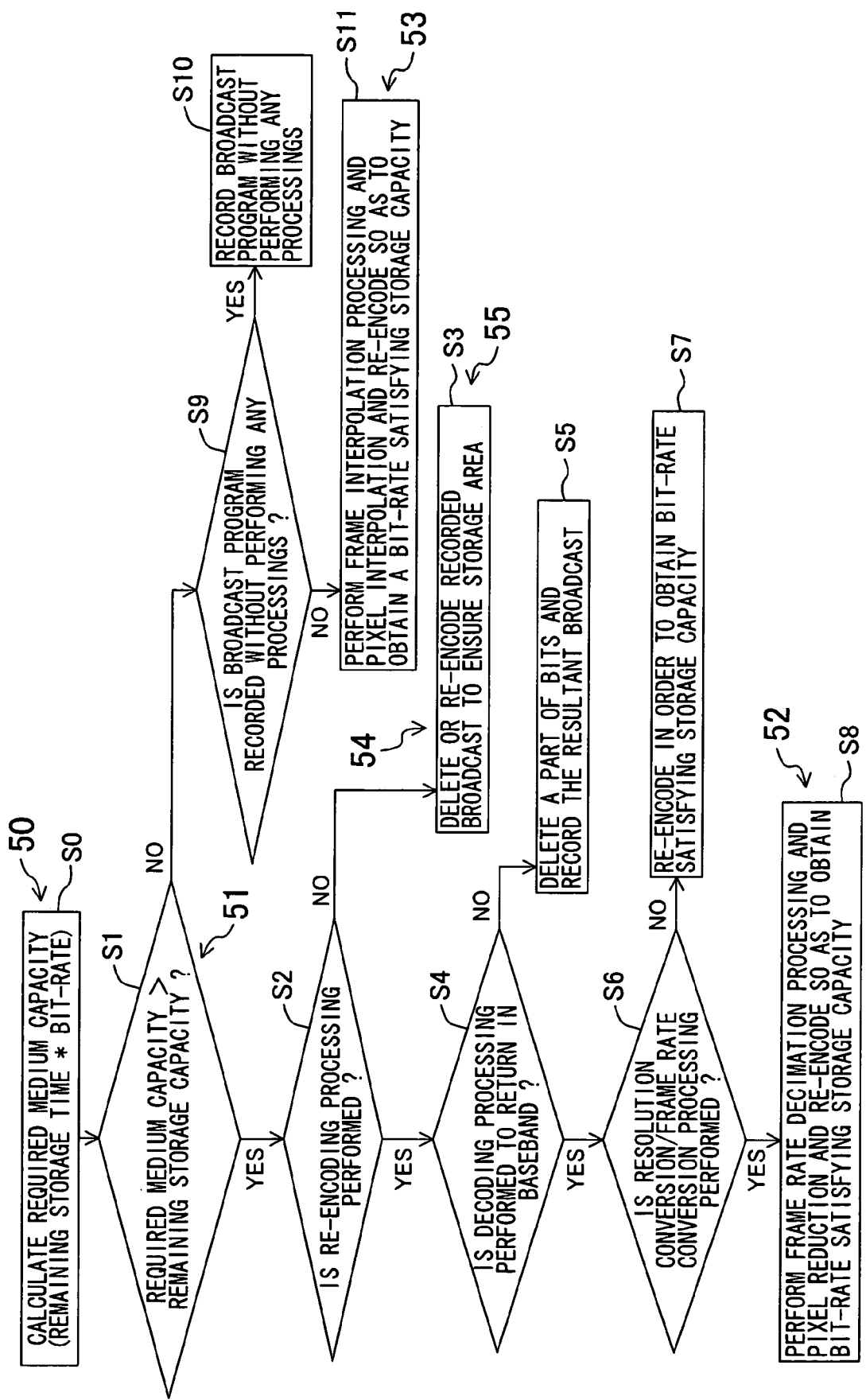
FIG. 2 is a flowchart illustrating the detail of a method for ensuring the storage time performed by the device for ensuring storage time for digital broadcast.

FIG. 2 illustrates a flowchart of the determination and processings after the determination. Referring to FIG. 2, firstly in step S0, the storage time for the broadcast program to be stored is multiplied by the bit-rate monitored in real time by the bit-rate determiner 19 in order to calculate a required capacity of the storage medium for the digitized broadcast program. A required capacity calculation circuit 50 is configured by step S0.

Next, in step S1, the calculated required capacity of the storage medium (result of multiplication) is compared with the remaining storage capacity of the storage medium to determine the magnitude relationship between the required capacity of the storage medium and the remaining storage capacity thereof. Namely, it is determined whether or not the required capacity of the storage medium is smaller than the remaining storage capacity and thus the broadcast program to be stored can be stored in the storage medium. A determination circuit 51 is configured by step S1.

If the remaining capacity of the storage medium is smaller as the result of comparison of magnitude, the process proceeds to step S2. In step S2, a determination is made as to whether the broadcast program to be stored is re-encoded at smaller bit-rate. If the re-encoding processing is performed, this re-encoding processing is performed by two kinds of methods. In accordance with one method, the broadcast to be stored is decoded in a compressed database band and then encoded again. In accordance with the other method, a part of bit stream of the broadcast is deleted in order to obtain a predetermined small bit-rate. Specifically explaining, in step S4, a determination is made as to whether the broadcast is subjected to the decoding processing to be returned in a baseband. If the answer to the determination in step S4 is NO., in step S5, a part of bits of the broadcast program to be stored is deleted so as to be missed therefrom. Various methods are provided for this deletion and may include, e.g., a method for deleting bits subjected to padding processing for controlling a fixed rate. If the answer to the determination as to whether the broadcast is returned in a baseband is YES, in step S6, whether or not a resolution conversion/frame rate decimation is performed is determined. If the answer to the determination in step S6 is NO, in step S7, the broadcast program returned in a baseband is subjected to the re-encoding processing so as to obtain a bit-rate which enables storing and recording within the remaining storage capacity, and the resultant re-encoded broadcast program is stored and recorded. If the answer to the determination as to whether the resolution conversion/frame rate decimation is performed is YES, in step S8, the frame rate decimation and pixel reduction are performed, and the re-encoding processing is performed upon the broadcast program to be stored in order to convert the bit-rate thereof into a predetermined small bit-rate so that the broadcast program can be stored within the remaining storage capacity of the storage medium. In this way, the required storage capacity of the storage medium is compressed. Then, the re-encoded broadcast program is stored in the storage medium in the drive section 16. Examples of the resolution conversion processing may include a method for converting the number of horizontal pixels from 720 to 544 or 720 to 352 by using a filter and a method for converting the number of vertical pixels. In the latter case, for example, a method for converting 480 vertical pixels into 240 pixels is known. The most simple method is to drop any field of pixels formed of Top Bottom. A bit-rate conversion circuit 52 is configured by steps S4 to S8.

If it is determined in step S2 that the re-encoding processing is not performed, in step S3, a broadcast program which has already been stored in the storage medium is deleted. Alternatively, the stored broadcast program is re-encoded to be compressed again in order to ensure a larger remaining storage capacity of the storage medium. A deletion circuit 54 and a re-compression circuit 55 are configured by step S3.

In the deletion or re-compression processing in step S3, if two or more broadcast programs have been already stored in the storage medium, priority is established in order to determine which of these broadcast programs should be deleted or re-compressed.

In accordance with the method for establishing priority, a broadcast program which is temporarily stored in the storage medium and then copied in other storage medium is set as the first priority for deletion/re-compression processing. A broadcast program which is stored in the storage medium but is not played back at all even after a predetermined period of time freely set by a user is determined as the second priority. A broadcast program which is stored in the storage medium and then played back by a user is set as the third priority. A broadcast program which was stored in the storage medium at the earliest date is set as the fourth priority. If a broadcast program satisfying these settings exists, the priority is established in an even further detailed manner.

Figure 3:
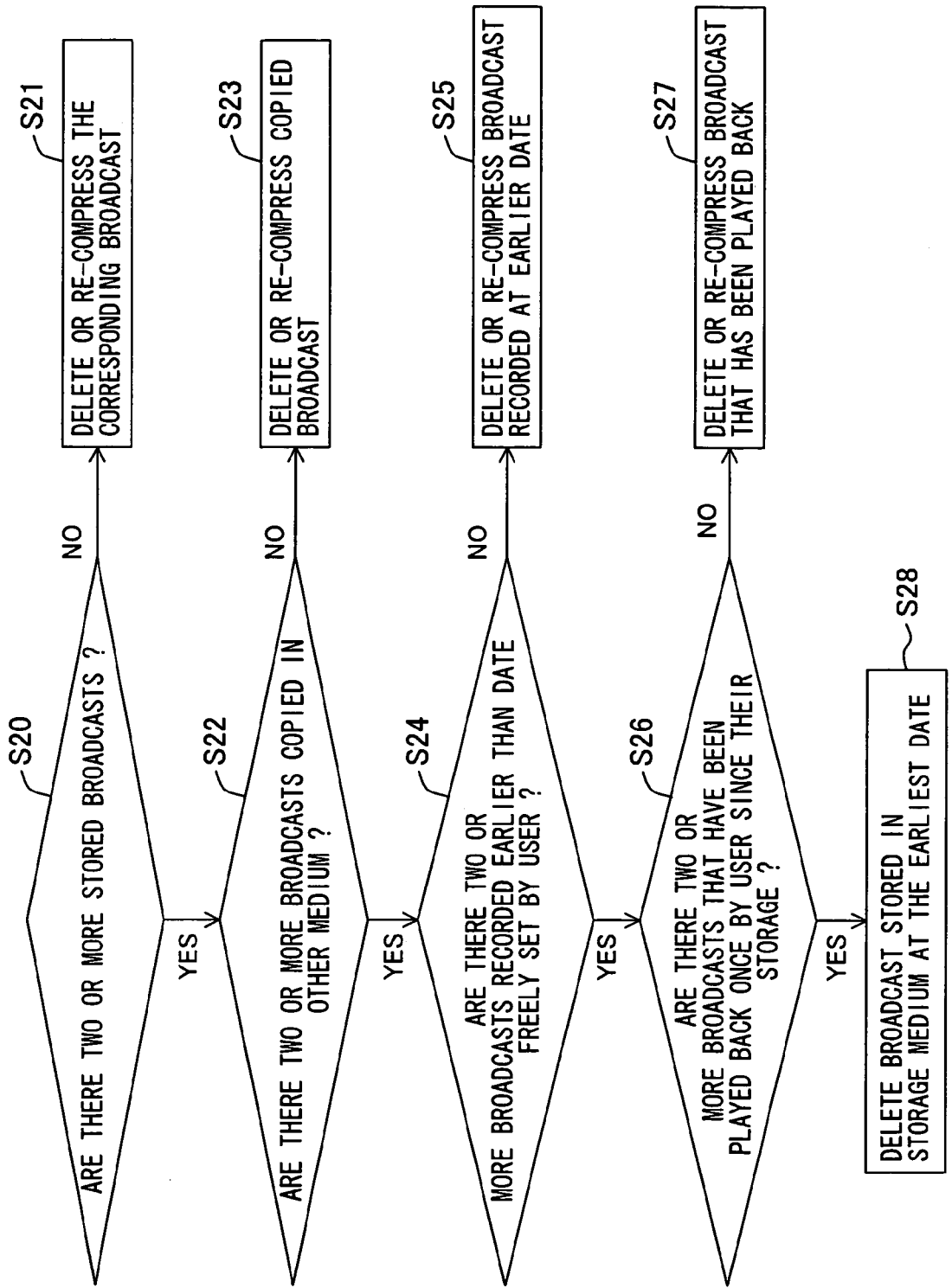
FIG. 3 is a view illustrating the algorithm for establishing the priority of a broadcast to be deleted or re-compressed.

Although various methods for establishing the priority exist, an example of them will be illustrated in FIG. 3 in this embodiment. Referring to FIG. 3, a determination is made in step S20 as to whether or not two or more stored broadcast programs are provided. If a plurality of stored broadcast programs do not exist and only one broadcast program exists, in step S21, this broadcast program is deleted or re-compressed. If there provided a plurality of broadcast programs, in step S22, whether or not two or more broadcast programs that are copied in other storage medium exist is determined. If only one broadcast program is copied in the other storage medium, in step S23, the copied broadcast program is deleted or re-compressed. If there provided a plurality of copied broadcast programs, a determination is made in step S24 as to whether or not two or more broadcast programs recorded earlier than a date freely set by a user exist. If there is provided only one broadcast program recorded earlier than the date, in step S25, this broadcast program is deleted or re-compressed. If there are provided two or more broadcast programs recorded earlier than the set date, in step S26, a determination is made as to whether or not there exist two or more broadcast programs that have been once decoded and played back by a user since their storage. If there is provided only one broadcast program that has been decoded and played back since its storage, in step S27, this played back broadcast program is deleted or re-compressed. If there exist two or more broadcast programs that have been played back once, in step S28, a broadcast program which was stored in the storage medium at the earliest date is deleted or re-compressed.

Then, returning to step S1 in FIG. 2, if the answer to the determination in step S1 is NO, i.e., if the broadcast program to be stored can be successfully stored in the storage medium and the remaining storage capacity is larger than the required capacity of the storage medium and thus remains, in step S9, a determination is made as to whether or not the broadcast program is stored and recorded with its original bit-rate, i.e., without converting the bit-rate of the broadcast program to be stored. If it is determined that the broadcast program is stored and recorded with its original bit-rate, in step S10, this broadcast program is recorded. If it is determined that the broadcast program is not recorded with its original bit-rate, in step S11, opposite to the processing in step S8 a frame interpolation and pixel interpolation processings are performed in order to convert the bit-rate into a larger bit-rate, so that high image quality is accomplished. Then, the resultant broadcast program is stored and recorded in the storage medium. A second bit-rate changing circuit 53 is configured by step S11. This processing may be performed with the highest possibility when an MPEG4 image is recorded as an MPEG2 image. In accordance with the MPEG4 image, unlike REC656 (30 Frame/sec, 720 horizontal pixels and 480 vertical pixels) serving as a format obtained by digitizing a general NTSC image, QCIF and CIF are provided as an image size and 15 Frame/sec is provided as a frame rate. Such image size and frame rate are converted by a filter into REC656 size, and then the MPEG4 image is re-encoded.

Returning to FIG. 1, the structure of the device for ensuring the storage time for digital broadcast is continuously described. The MPEG decoder 10 is a decoder for returning a compressed MPEG1, MPEG2 or MPEG4 broadcast in a baseband. This decoder 10 may utilize, in addition to MPEG, JPEG, Motion JPEG or a compression system which is not defined by ISO. The MPEG decoder 10 has the function of deleting padding bits described in step S5 in FIG. 2 as well as the function of decoding the broadcast program stored in the storage medium in a baseband at the time of playing back the same.

The image resolution/frame rate converter 9 illustrated in FIG. 1 performs, as well as the reduction and interpolation processings for horizontal resolution and the conversion of vertical resolution, the frame rate decimation and interpolation. An NTSC/PAL/SECAM encoder 8 is used to convert digital broadcast data into an analog signal in order to output to a television monitor, and converts, in order to correspond to broadcasting systems for all over the world, an NTSC system used in the United States and Japan, a PAL system used in European countries and China and an SECAM system used in the former USSR into the respective analog systems. In the case of not standard broadcasting but broadcasting with high resolution, an encoder corresponding to such broadcasting is required.

An NTSC/PAL/SECAM decoder 7 converts an analog signal from an analog tuner 15 into a digital signal, and corresponds to the NTSC system, the PAL system and the SECAM broadcasting. The analog broadcast is usually disturbed in a weak electric field, and a vertical or horizontal retrace line interval becomes long or short. This phenomenon may be occurred by a line input such as an input from VTR as well as an input from the analog tuner 15. A TBC circuit 18 corrects this phenomenon. The TBC circuit 18 usually accomplishes the correction by writing a once disturbed signal in a frame memory and reading out the signal.

Depending on the range of correction, the correction can be realized simply by writing in a line memory. The output from the TBC circuit 18 is compressed and encoded in the MPEG encoder 11. The compression system in the MPEG encoder 11 may be, in addition to MPEG1, MPEG2 and MPEG4, JPEG, Motion JPEG and a compression system which is not defined by ISO. The compressed stream is written via the stream controller 6 into the storage medium on the drive 16.

The stream controller 6, the image resolution/frame rate converter 9, the MPEG decoder 10, the MPEG encoder 11 and the microcomputer 14 are integrated into one chip.

The MPEG encoder 11 and the MPEG decoder 10 are existing devices required for recording/playing back an analog broadcast or an analog line input. In accordance with this embodiment, a record/play-back system for existing devices including such devices is utilized for the decoding and encoding processings in steps S3, S7, S8 and S11 illustrated in FIG. 2. Thus, in accordance with this embodiment, existing devices can be shared and thus the present invention can be provided inexpensively.

What is claimed is:

1. A method for ensuring a storage time for digital broadcast at the time of storing broadcast data transmitted in a state of being digitized and compressed, comprising the steps of:
    monitoring a predetermined recording time for the broadcast and a bit-rate of the broadcast in the compressed state and calculating, in real time, a required capacity of a storage medium;
    determining whether or not said calculated required capacity of the storage medium can be contained within an empty area or a freely limited area of the storage medium;
    if said calculated required capacity of the storage medium cannot be contained as the result of said determination, converting, in real time, said bit-rate of the broadcast into a smaller one by decoding and then re-compressing the broadcast data in the compressed state; and
    storing said converted broadcast in said storage medium.

2. The method for ensuring a storage time for digital broadcast of claim 1 further comprising the steps of:
    if said calculated required capacity of the storage medium can be contained as the result of said determination, determining whether or not said empty area or freely limited area of the storage medium remains;
    if said empty area or freely limited area remains, converting, in real time, said bit-rate of the broadcast into a larger one; and
    storing said converted broadcast into said storage medium.

3. The method for ensuring a storage time for digital broadcast of claim 1 further comprising the step of:
    if said calculated required capacity of the storage medium can be contained as the result of said determination, storing said broadcast in said storage medium without converting the bit-rate.

4. The method for ensuring a storage time for digital broadcast of claim 1, wherein said step of converting said bit-rate of the digitized broadcast into a smaller one is an operation of missing a part of said broadcast data.

5. The method for ensuring a storage time for digital broadcast of claim 1, wherein said step of converting said bit-rate of the digitized broadcast into a smaller one is an operation of returning said broadcast in a baseband and performing a compression processing again for the broadcast.

6. The method for ensuring a storage time for digital broadcast of claim 5, wherein said operation of returning said broadcast in a baseband and performing a compression processing again for the broadcast is performed by utilizing a system for compressing an analog broadcast, decoding the compressed digital data and then playing back the resultant data.

7. The method for ensuring a storage time for digital broadcast of claim 5, wherein said step of converting said bit-rate of the digitized broadcast into a smaller one is an operation of returning said broadcast in a baseband, then performing image resolution conversion or image frame rate conversion upon the broadcast and performing the compression processing again upon the resultant broadcast.

8. The method for ensuring a storage time for digital broadcast of claim 1, wherein said step of converting said bit-rate of the digitized broadcast into a smaller one is performed by selecting one from three kinds of operations, i.e., the operation of missing a part of the broadcast data, the operation of returning the broadcast in a baseband and performing a compression processing again upon the broadcast and the operation of returning the broadcast in a baseband, then performing image resolution conversion or image frame rate conversion upon the broadcast and performing the compression processing again upon the resultant broadcast.

9. The method for ensuring a storage time for digital broadcast of claim 1 further comprising the step of:
    if said calculated required capacity of the storage medium cannot be contained, deleting a broadcast which has been already stored in said storage medium to ensure the required capacity of the storage medium.

10. The method for ensuring a storage time for digital broadcast of claim 9, wherein when a plurality of already stored broadcasts exist in the storage medium, a broadcast that a set period of time or longer has passed since its storage will be deleted.

11. The method for ensuring a storage time for digital broadcast of claim 9, wherein when a plurality of already stored broadcasts exist in the storage medium, a broadcast which has been decoded at least once since its storage will be deleted.

12. The method for ensuring a storage time for digital broadcast of claim 9, wherein when a plurality of already stored broadcasts exist in the storage medium, a broadcast which is stored in the storage medium and then copied in other storage medium will be deleted.

13. The method for ensuring a storage time for digital broadcast of claim 9, wherein when a plurality of already stored broadcasts exist in the storage medium, a broadcast which was stored at the earliest date will be deleted.

14. The method for ensuring a storage time for digital broadcast of claim 9, wherein when a plurality of already stored broadcasts exist in the storage medium, a broadcast that a set period of time or longer has passed since its storage, a broadcast which has been decoded at least once since its storage, a broadcast which is stored in the storage medium and then copied in other storage medium or a broadcast which was stored at the earliest date will be deleted, and these broadcasts are selected in accordance with a predetermined priority.

15. The method for ensuring a storage time for digital broadcast of claim 1 further comprising the step of:
    if said calculated required capacity of the storage medium cannot be contained, re-compressing said broadcast which has been already stored in the storage medium to ensure the required capacity of the storage medium.

16. The method for ensuring a storage time for digital broadcast of claim 15, wherein said step of re-compressing said broadcast which has been already stored in the storage medium is performed by the operation of missing a part of the stored broadcast data, the operation of returning the stored broadcast in a baseband and performing a compression processing again upon the broadcast or the operation of returning said stored broadcast in a baseband, then performing image resolution conversion or image frame rate conversion and performing a compression processing again upon the broadcast.

17. The method for ensuring a storage time for digital broadcast of claim 15, wherein when a plurality of already stored broadcasts exist in the storage medium, a broadcast that a set period of time or longer has passed since its storage will be re-compressed.

18. The method for ensuring a storage time for digital broadcast of claim 15, wherein when a plurality of already stored broadcasts exist in the storage medium, a broadcast which has been decoded at least once since its storage will be re-compressed.

19. The method for ensuring a storage time for digital broadcast of claim 15, wherein when a plurality of already stored broadcasts exist in the storage medium, a broadcast which is stored in the storage medium and then copied in other storage medium will be re-compressed.

20. The method for ensuring a storage time for digital broadcast of claim 15, wherein when a plurality of already stored broadcasts exist in the storage medium, a broadcast which was stored at the earliest date will be re-compressed.

21. The method for ensuring a storage time for digital broadcast of claim 15, wherein when a plurality of already stored broadcasts exist in the storage medium, a broadcast that a set period of time or longer has passed since its storage, a broadcast which has been decoded at least once since its storage, a broadcast which is stored in the storage medium and then copied in other storage medium or a broadcast which was stored at the earliest date will be re-compressed, and these broadcasts are selected in accordance with a predetermined priority.

22. A device for ensuring a storage time for digital broadcast at the time of storing broadcast data transmitted in a state of being digitized and compressed comprising:
  a required capacity calculation circuit for monitoring a predetermined recording time of the broadcast and a bit-rate of the broadcast in the compressed state and calculating, in real time, a required capacity of the storage medium;
  a determination circuit for determining whether or not the required capacity of the storage medium calculated in said required capacity calculation circuit can be contained within an empty or freely limited area in the storage medium; and
  a bit-rate conversion circuit for, if said calculated required capacity of the storage medium cannot be contained as the result of said determination by said determination circuit, converting, in real time, said bit-rate of the broadcast into a smaller one by decoding and then re-compressing the broadcast data in the compressed state and storing the converted broadcast in said storage medium.

23. The device for ensuring a storage time for digital broadcast of claim 22, wherein said determination circuit further determines, if said calculated required capacity of the storage medium can be contained, whether or not said empty or freely limited area of the storage medium remains, and said device further comprising:
  a second bit-rate changing circuit for, if the empty or freely limited area remains as the result of said determination by said determination circuit, converting, in real time, said bit-rate of the broadcast into a larger one and storing the converted broadcast in said storage medium.

24. The device for ensuring a storage time for digital broadcast of claim 22, wherein said required capacity calculation circuit comprising:
  a determination circuit for writing an inputted broadcast stream in a storage memory and determining said bit-rate of the broadcast on the basis of its storage time and storage amount.

25. The device for ensuring a storage time for digital broadcast of claim 22 further comprising:
  a deletion circuit for, if said calculated required capacity of the storage medium cannot, be contained as the result of determination by said determination circuit, deleting a broadcast which has been already stored in the storage medium.

26. The device for ensuring a storage time for digital broadcast of claim 22 further comprising:
  a re-compression circuit for, if said calculated required capacity of the storage medium cannot be contained as the result of determination by said determination circuit, re-compressing a broadcast which has been already stored in the storage medium.

27. The device for ensuring a storage time for digital broadcast of claim 22, wherein said required capacity calculation circuit, said determination circuit and said bit-rate conversion circuit are integrated onto a chip.

* * * * *